July 14, 1931. G. W. CHRISTIANS 1,814,127
PROCESS AND APPARATUS FOR SEALING CONSTRUCTION AND EXPANSION JOINTS
Filed March 26, 1930 3 Sheets-Sheet 1
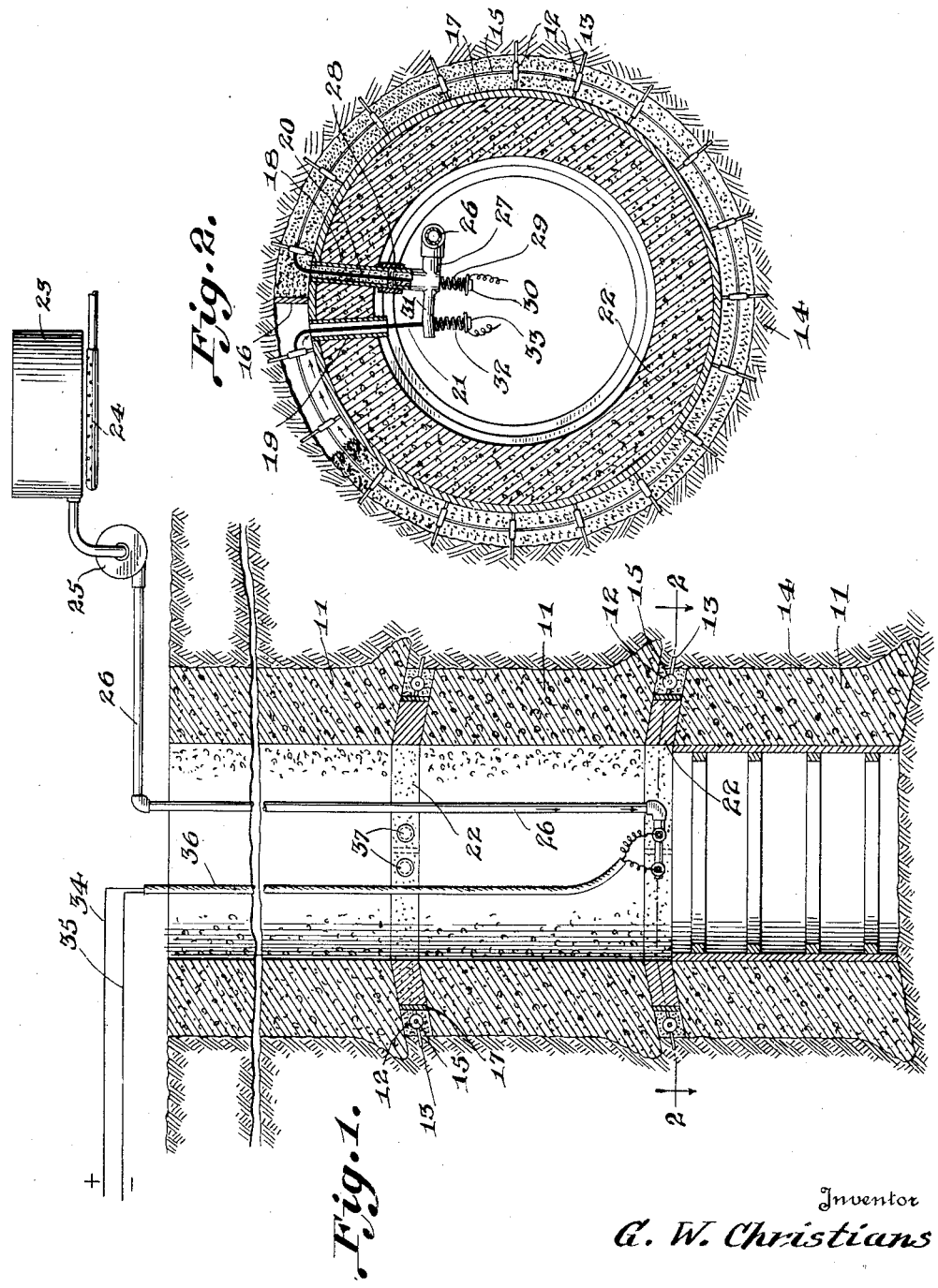
Inventor
G. W. Christians
By Robt. E. Barry
Attorney

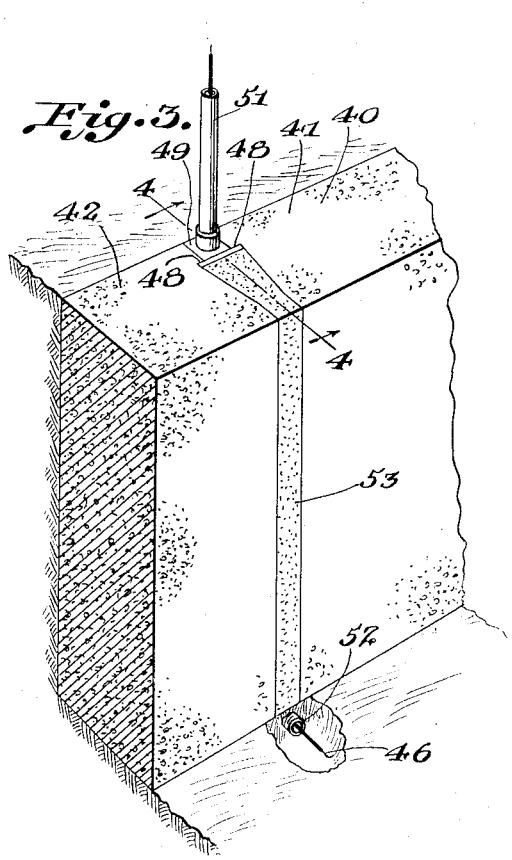
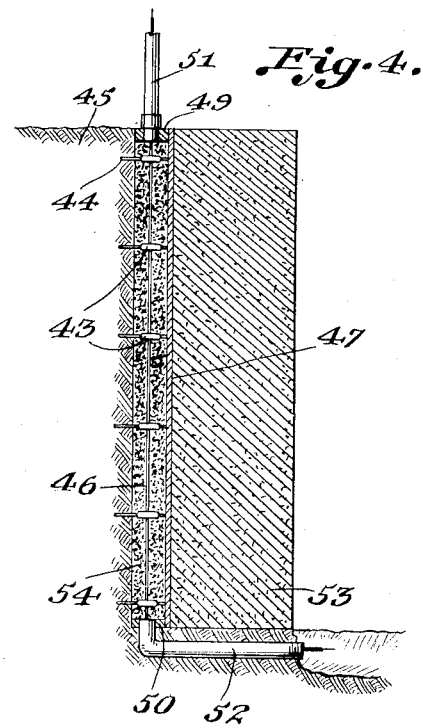
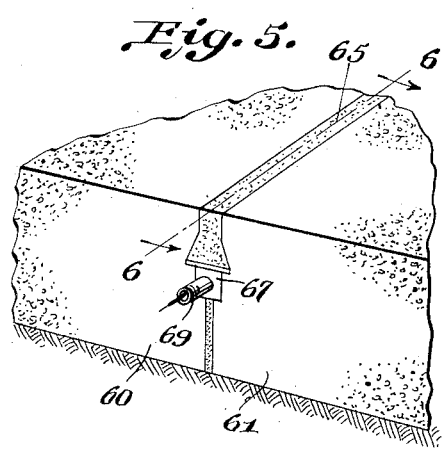
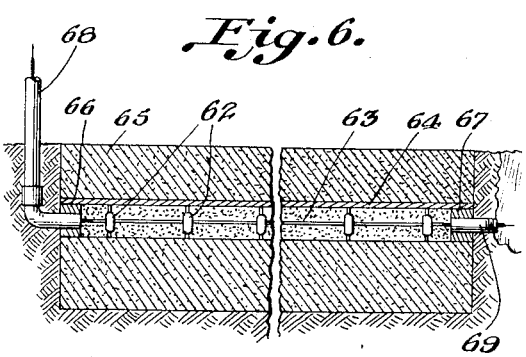

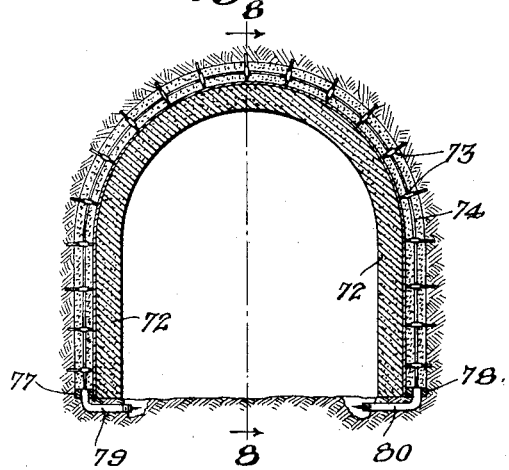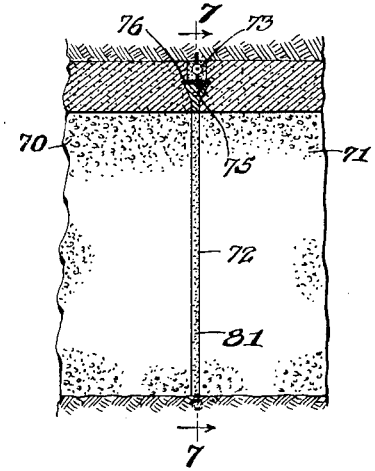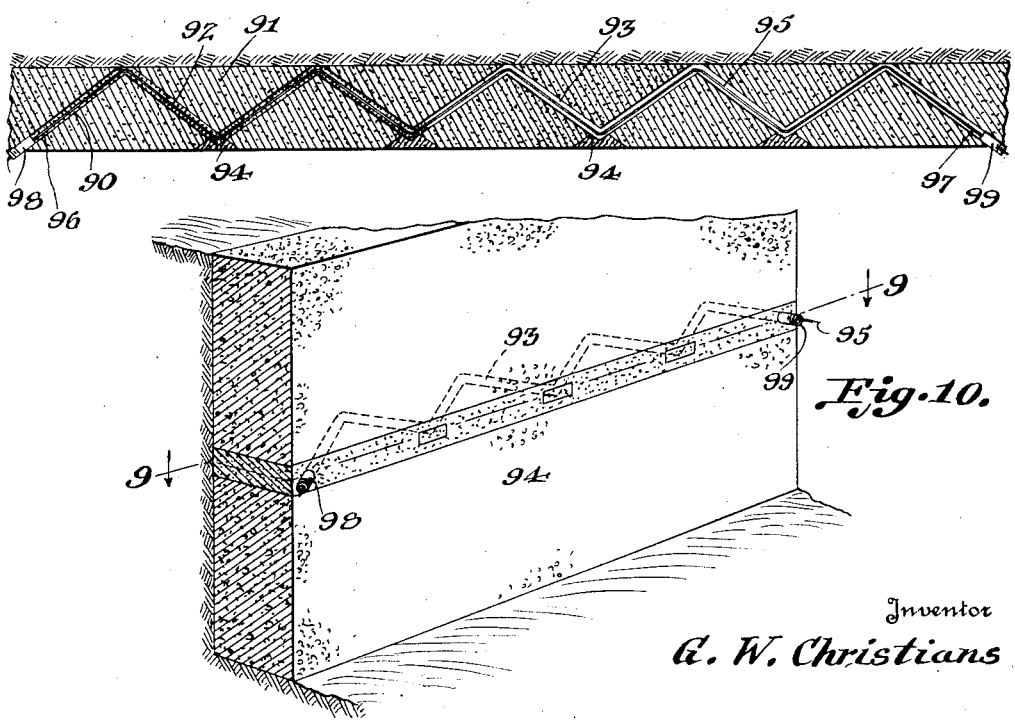

Patented July 14, 1931

1,814,127

UNITED STATES PATENT OFFICE

GEORGE W. CHRISTIANS, OF CHATTANOOGA, TENNESSEE

PROCESS AND APPARATUS FOR SEALING CONSTRUCTION AND EXPANSION JOINTS

Application filed March 26, 1930. Serial No. 439,153.

This invention relates to processes and apparatus for sealing construction and expansion joints by means of thermoplastic materials, such as asphalt, and may be used for the sealing of joints in concrete for shafts, tunnels, subways, building walls or floors, where it is desired to prevent leakage.

One of the salient objects of the present invention is to provide a system in which a passageway is left in the joint when the latter is made, and through this passageway, I extend an electric heating element which functions to maintain thermoplastic material in fluid condition while it is forced through the passageway from one end to the other. The system is such that as soon as the sealing material commences to discharge from the outlet end of the passageway, this end may be closed by a suitable plug, so that the material may be forced into the other end of the passageway under suitable pressure until the seal is completed.

Another object is to furnish a system of this character including a feed pipe and an electric conductor which may be extended from a common supply point to the various joints to be sealed, and may be readily attached to the structure in which the joint is formed.

A further object is to plug the joint in forming the passageway in such manner that the pressure exerted on the sealing material acts to wedge the plug in the joint and thereby prevent leakage of the sealing material from the passageway while the sealing material is being forced into the latter.

Another object is to provide a system for sealing existing joints by drilling suitable holes in the joint at angles to one another, so as to form a tortuous passageway through which the electric heating element may be threaded, and through which the fluid thermoplastic material may be pumped.

With the foregoing objects outlined and with other objects in view which will appear as the description proceeds, the invention consists in the novel features hereafter described in detail, illustrated in the accompanying drawings, and more particularly pointed out in the appended claims.

Referring to the drawings,

Fig. 1 is a vertical sectional view of a shaft undergoing sealing by means of my improved system.

Fig. 2 is a sectional view of the same on the line 2—2 of Fig. 1.

Fig. 3 is a perspective view of a wall and one of its vertical joints, the latter being provided with a portion of the improved sealing means.

Fig. 4 is a vertical sectional view on the line 4—4 of Fig. 3.

Fig. 5 is a perspective view of a joint in a floor or vertical wall, to be sealed in accordance with my invention.

Fig. 6 is a vertical sectional view of the same on the line 6—6 of Fig. 5.

Fig. 7 is a transverse sectional view of a portion of a tunnel showing the manner of sealing a joint in the same by means of my invention, the section being taken on the line 7—7 of Fig. 8.

Fig. 8 is a sectional view of the tunnel on the line 8—8 of Fig. 7.

Fig. 9 is a horizontal sectional view of a portion of a wall joint, and illustrating the manner of sealing such existing joints, the sections being taken on the line 9—9 of Fig. 10.

Fig. 10 is a perspective view partly in section, of the structure illustrated in Fig. 9.

In the embodiment of the invention illustrated in Figs. 1 and 2, shaft lining rings 11 of concrete are poured in the usual manner, a lower ring always being poured after the next adjacent ring above. However, in providing joints between these rings, after the concrete has been poured up to within say three inches of the lower end of an upper ring, a three inch circular cavity will be left between the adjacent ends of the two rings. In the outer portion of this cavity, I arrange at spaced points, insulators 12 which may be equipped with pins 13, so that they can be driven into the soil 14 surrounding the shaft, and through these insulators, I thread a resistance wire 15, so as to form a substantially circular electric heating element, as shown in Fig. 2. The recess in which the wire is arranged is provided with a radially disposed partition or dam 16, and then a circular partition or dam 17 is vertically arranged in the cavity, so as to form a passageway through which thermoplastic material may be pumped. The inlet end of this passageway communicates with a short pipe 18 which extends inwardly to the bore of the shaft. The outlet of the passageway is also connected to a similar outlet pipe 19, and the end portions 20 and 21 of the wire which extend through these pipes, are preferably insulated so as to prevent short circuiting.

After the insulators 12, heating wire 15, dams 16 and 17, and pipes 18 and 19 have been arranged as shown in Fig. 2, an annulus 22 of rather dry mortar is placed between the dam 17 and the bore by hand, so as to complete the joint.

In this way, each joint is formed as the shaft is poured, and preferably, after all of the joints have been made, I seal the passageways in the joints by means of thermoplastic material. Such material may be placed in a supply tank 23 that is maintained in heated condition by any suitable means such as a burner 24. Assuming that the sealing material is asphalt, such asphalt will be forced by a pump 25 from the tank through a down pipe 26, the lower end of which is provided with a fitting 27 that is coupled to the intake pipe 18 by means of an ordinary threaded collar 28. It will be understood that in this way the asphalt may be pumped into the intake pipe 18 of the passageway, and will travel around the latter until it commences to discharge through the outlet pipe 19. At such time, the latter may be plugged so that further pumping will act to compress the thermoplastic material, and to cause the same to move into adjacent interstices, so as to effectively seal the joint.

For the purpose of maintaining the sealing material in fluid condition as it flows around the passageway, and seals the joint, the insulated end 20 of the wire extends through the fitting 27, and is maintained taut by a spring 29 which is arranged between a stop member 30 at the outer end of the wire, and the fitting 27. The fitting is provided with a solid arm 31 through which the insulated end 21 of the wire extends, and this end is held taut by a spring 32 that presses at one end against the arm 31, and at the other end against a stop member 33 on the end of the wire.

Current is led to the heating wire from line wires 34 and 35 by means of a cable 36, and it will be understood that when current is permitted to flow through the wire 15, that the interior of the passageway will be maintained at proper temperature to keep the thermoplastic material in fluid condition.

After a joint is sealed in this manner, the fitting 27 can be extended to the next joint, the ends 20 and 21 of the heating wire can be severed, and then screw threaded caps 37 can be used to close the ends of the pipes 18 and 19. Subsequently, if it is necessary to renew the sealing, the caps 37 can be removed, the fitting 27 can be attached to the pipe 18, and the ends of the heating wire can be connected to the line wires. Then, when current is passed through the heating wire, the thermoplastic material within the joint will be softened, and the pressure of the pump 25 may be used to force additional thermoplastic material into the joint.

The insulators 12 are not especially important. Usually, there is no other highly conducting material present, and with the low voltages used, there will be very little loss of current, if the heating wire did make contact with the rock or concrete. For the same reason, springs 29, 32 to keep the wire taut, are not essential.

In Figs. 3 and 4, I illustrate the manner in which this system may be employed to seal vertical joints in a concrete wall. For example, at the time of erecting the wall 40, a vertical space, (a portion of which is wedge-shaped as illustrated), if left between adjacent portions 41 and 42 of the same, and the opposite walls of this space are preferably shaped as shown in Fig. 3. Consequently, insulators 43 may be arranged in the rear portion of this space, and these insulators may be provided with pins 44 to permit them to be supported by the ground 45 against which the wall is erected. As these insulators are arranged one above the other, a heating wire 46 may be vertically threaded through the same, and then a partition or dam 47 may be placed in the crevice with its edges resting against vertical shoulders 48 formed in the wedge-shaped portion of the slot. Afterwards, dams or end closures 49 and 50 may be arranged at the ends of the passageways, thus formed, and an inlet pipe 51 is connected to the end closure 49, and an outlet pipe 52 is connected to the end closure 50, and the ends of the heating wire are insulated and extended through these pipes, so that they may be connected to the line wires.

After assembling the parts in this manner, a grout plug 53 or the like, may be introduced into the wedge-shaped portion of the crevice to hold the dam 48 in place, and to complete the joint.

Then, a pumping apparatus and fitting 27, as shown in Figs. 1 and 2, may be used to force hot asphalt or other suitable thermoplastic material through the passageway, so as to fill the latter with the sealing material, as indicated at 54, and as soon as this material commences to discharge from the pipe 52, the latter can be plugged to allow the necessary pressure to be placed on the sealing material to properly complete the sealing.

The more pressure placed on this sealing material, the more firmly will the plug 53 be wedged into the slot between the wall sections, without forcing out the plugging material. The wedge-shaped portion of the slot also makes it easy to install the dam 48.

Of course, after the job is completed, the ends of the pipes 51 and 52 may be provided with caps such as 37, so as to permit renewing of the seal in the future in the same manner as that described in connection with Figs. 1 and 2.

The same procedure may be followed in sealing a joint in a floor or horizontal joint in a vertical wall, as illustrated in Figs. 5 and 6. In such a case, a crevice will be left between adjacent slabs 60 and 61 of the floor, and in the bottom portion of this crevice, a horizontal series of insulators 62 may be placed to support the resistance wire 63. A horizontal dam or partition 64 will be located above the insulators to complete the passageway, and afterwards, grouting 65 may be introduced into the crevice to complete the joint.

End closures 66 and 67 will be arranged at the ends of the passageway, and they will be connected respectively to the inlet and outlet pipes 68 and 69, through which the insulated ends of the heating wire extend.

Obviously, when the ends of the resistance wire are connected to suitable line wires, and hot asphalt or the like is pumped into the pipe 68, such sealing material will move along the passageway and seal the joint.

The same process may be employed to seal the joints between the sections of lining of a tunnel. For instance, as shown in Figs. 7 and 8, at the time the concrete sections 70 and 71 of the tunnel are poured, a vertical crevice or recess 72 will be left between the ends of the same, and in this crevice, I place at spaced points, insulators 73 which may be driven into the solid and form a support for the resistance wire 74. After the latter has been introduced, the passageway is completed by placing a dam strip or partition 75 against shoulders 76 on the sections, and the ends of the passageway are provided with closures 77 and 78 that are joined respectively to the inlet and outlet pipes 79 and 80, through which the insulated ends of the resistance wire extend. The joint is completed by grouting 81, and when it is desired to seal the joint, the ends of the resistance wire are connected to the line wires, and hot thermoplastic material is pumped into the pipe 79, and travels along the passageway until it exits through the pipe 80. At this time the pipe 80 is plugged and the pumping is continued, so as to cause the sealing material to penetrate any crevices or interstices and effectively seal the joint.

If it is desired to use this system for sealing joints in existing structures, this may be done in the manner which will now be described in connection with Figs. 9 and 10. Those Figures show a horizontally disposed joint, but I desire to be understood that the same system may be employed for vertical joints or for joints of the type shown in Figs. 1 to 8 inclusive. In either event, a drill or the like is employed to form a tortuous passageway along the joint. For instance, the drill may be used to extend an inclined duct 90 from the exterior of the wall through the joint material 91 to the rear of the wall, and then another duct 92 may be drilled from the exterior, so as to make a V-shaped conduit. This procedure is continued until a zig-zag passageway 93 extends throughout a desired length of the joint, and afterwards, points of entrance of the drill may be closed by means of plugs 94 of concrete or the like, and finally, a resistance wire 95 is threaded through this passageway from the inlet 96 to the outlet 97 of the passageway. Insulated ends of this wire are passed through inlet and outlet pipes 98 and 99, and these ends are connected to the line wires. Afterwards, the hot thermoplastic material is forced through the tortuous passageway, and is maintained in heated condition during such passage by means of the resistance wire. As soon as the sealing material commences to discharge from the pipe 99, the latter is plugged and the pumping is continued until proper sealing is effected. Then the pumping means is disconnected from the pipe 98, the wires are severed, and screw caps may be placed on the outer ends of the pipes, so as to allow the sealing to be renewed in the future whenever desired.

Heretofore, I have proposed the sealing of joints by extending a pipe along the joint and pumping hot asphalt through this pipe while maintaining the interior of the pipe in heated condition. In that proposal, the hole extends only part way along the joint, and the hole has a bottom. Consequently, one cannot readily ascertain when the hole is completely filled. Whereas with my improved system, the passageway has open ends, the sealing material being pumped into one of these ends, and travelling toward the other, so that as soon as the material commences to discharge from the outlet end of the passageway, an indication is immediately given that the passageway is full. At such time, the operator plugs the outlet end of the passageway and then completes the operation under pressure.

It will also be appreciated that the present invention eliminates the necessity of using a pipe line in the passageway, for I simply make use of the passageway itself to provide a conduit for the sealing material. Moreover, the present system assists in preventing short circuiting, due to the fact that the material in the passageway may readily flow around the insulators.

While I have disclosed what I now consider to be preferred embodiments of the invention in such manner that the same may be readily understood by those skilled in the art, I am aware that changes may be made in the details disclosed, without departing from the spirit of the invention, as expressed in the claims.

What I claim and desire to secure by Letters Patents is:

1. A method of sealing construction or expansion joints, comprising extending a passageway along said joint, forcing hot thermoplastic material into one end of said passageway and causing the same to flow along the passageway toward the other end of the latter, plugging the last mentioned end of the passageway, and radiating heat within the passageway to maintain the sealing material in fluid condition during the sealing operation.

2. A method of sealing construction or expansion joints, comprising extending a passageway along the joint, forcing hot thermoplastic material through the passageway from one end of the latter to the other, plugging the last mentioned end of the passageway after the sealing material commences to escape from the same, radiating heat from within the passageway for maintaining the sealing material in fluid condition during the sealing operation, and continuing to force the sealing material into the passageway under pressure after the outlet end of the passageway has been plugged.

3. A method of sealing construction or expansion joints, comprising extending a passageway along the joint, forcing hot thermoplastic sealing material through the passageway from one end to the other of the latter, plugging the last mentioned end of the passageway after the sealing material commences to escape from the same, electrically heating the passageway for maintaining the sealing material in fluid condition during the sealing operation, and continuing to pump sealing material into the passageway under pressure after the plugging of the outlet end of the passageway.

4. A method of sealing construction or expansion joints, comprising extending a passageway along the joint, extending a resistance wire along the passageway, forcing hot thermoplastic sealing material through the passageway from one end of the latter toward the other, plugging the last mentioned end of the passageway as soon as the sealing material commences to escape from the same, and passing electric current through said resistance wire while the sealing material is flowing through the passageway for maintaining said material in fluid condition.

5. A method of sealing construction or expansion joints, comprising extending a passageway along said joint and causing the ends of the passageway to extend to the exterior of the joint, extending a resistance wire along said passageway, and projecting the ends of said wire through the ends of the passageway, forcing hot thermoplastic sealing material through the passageway from one end of the latter toward the other, and passing an electric current through said wire to generate heat for maintaining the sealing material in fluid condition while flowing through the passageway.

6. A method for sealing construction or expansion joints, comprising extending a passageway along the joint, extending conduits from the ends of the passageway to the exterior of the joint, one of said conduits forming an inlet and the other an outlet for the passageway, forcing hot thermoplastic sealing material through the passageway by introducing the same under pressure into the inlet conduit of the passageway, and generating heat within the passageway for maintaining the sealing material in fluid condition in the latter during the sealing operation.

7. A method of sealing construction and expansion joints, comprising extending a passageway along the joint, extending conduits from the ends of the passageway to the exterior of the joint, one of said conduits forming an inlet and the other an outlet for the passageway, forcing hot thermoplastic sealing material through the passageway by introducing the same under pressure into the inlet conduit, maintaining the sealing material in fluid condition while flowing through the passageway, and capping the exterior ends of the conduits after the sealing operation is completed.

8. A method of sealing construction or expansion joints, comprising extending a passageway along the joint, extending inlet and outlet conduits from the ends of the passageway to the exterior of the joint, arranging an electric resistance wire along the passageway and projecting its ends to the exterior through said conduits, forcing hot thermoplastic sealing material through the passageway by introducing the same under pressure into the inlet conduit, passing an electric current through the resistance wire during the sealing operation for maintaining the sealing material in fluid condition as it flows through the passageway, afterwards severing the ends of the resistance wire and permitting said ends to remain within said conduits, and finally capping the exterior ends of said conduits.

9. A method of sealing construction and expansion joints, comprising extending a passageway along the joint, arranging insulators at spaced points along the passageway, extending a resistance wire along the passageway and connecting the wire to said insulators, extending the ends of the wire to the exterior of the joint, forcing hot thermoplastic material through the passageway from end to end of the latter under pressure, and thereby completely filling the passageway with said thermoplastic material, and passing electric current through the resistance wire during the sealing operation for maintaining the thermoplastic material in fluid condition as it flows through the passageway.

10. A method of sealing a joint between concrete lining rings of a shaft, comprising leaving an annular space between the ends of adjacent rings during the pouring of the concrete, arranging insulators radially along said space, placing dams in the space so as to form with the concrete and the surrounding soil, a passageway, extending an inlet and an outlet conduit into the shaft from the ends of the passageway, filling the remainder of the space interiorly of one of said dams with plastic material, extending a resistance wire through said conduits and passageway, and connecting the wire to the insulators, forcing hot thermoplastic sealing material through the passageway by introducing the same under pressure into the inlet conduit and allowing it to flow toward the outlet conduit, and passing an electric current through said resistance wire during the sealing operation for maintaining the sealing material in fluid condition as it flows along the passageway.

11. A method of sealing a joint between adjacent ends of the concrete rings of a shaft line, comprising extending an annular channel-way between the adjacent ends of the rings, placing a dam transversely across the channel-way, arranging insulators radially along the channel-way, then placing an annular dam at the mouth of the channel-way so as to form a passageway having its ends separated by the transverse dam, extending inlet and outlet conduits from the ends of the passageway to the interior of the shaft, extending a resistance wire along the passageway through said insulators and permitting its ends to project through said conduits, forcing hot thermoplastic sealing material under pressure through the passageway by introducing the same into said inlet conduit, and maintaining the sealing material in fluid condition within the passageway by passing an electric current through said resistance wire.

12. A method of sealing construction joints or the like, comprising leaving a channel-way along the joint during the erection of the structure, extending a resistance wire through said channel-way, supporting the wire in the channel-way by insulators, placing a dam in the channel-way to provide a passageway through which the wire extends, forcing hot thermoplastic material through said passageway from end to end of the latter, and passing electric current through the resistance wire for maintaining said material in fluid condition during the sealing operation.

13. A method of sealing a joint in an existing construction, comprising cutting a tortuous passageway along the joint, forcing hot thermoplastic material under pressure through said passageway, and generating heat within the passageway for maintaining the material in fluid condition as it flows along the latter.

14. A method of sealing an existing joint in a construction, comprising cutting V-shaped conduits along the joint, connecting these conduits to form a tortuous passageway extending along the joint, forcing hot thermoplastic material through said passageway from end to end of the latter, and maintaining the material in fluid condition as it flows through said passageway.

15. A method of sealing joints in existing constructions, comprising cutting conduits along a joint at angles to one another, and thereby forming a tortuous passageway, plugging the joint at certain points of entrance of the cutting tool to render the passageway unbroken from end to end, and forcing sealing material through said passageway from one end to the other.

16. An apparatus for use in sealing construction or expansion joints, comprising spaced insulators to be arranged within a passageway that extends along the joint, inlet and outlet conduits for the passageway, a resistance wire supported by the insulators, extending along the passageway and having its ends projecting through said conduits, means for electrically connecting the ends of the resistance wire to a source of electric current, a tubular fitting detachably connected to said inlet conduit, and means for heating and forcing thermoplastic material into said fitting.

17. An apparatus for sealing construction or expansion joints, comprising means to form a passageway in said joint, inlet and outlet conduits connected to the ends of the passageway, an electric resistance wire extending along the passageway and having its ends projecting through said conduits, means for passing electric current to said wire, a tubular fitting detachably connected to said inlet conduit, and means for heating and pumping hot thermoplastic material to said fitting.

18. A construction or expansion joint, comprising a passageway having inlet and outlet conduits, substantially solid thermoplastic sealing material filling said passageway, an electric resistance wire extending along the passageway, embedded in said sealing material and having its ends projecting into the conduits, and caps closing the external ends of said conduits.

19. A method of sealing construction or expansion joints, comprising shaping opposite walls of the joint to provide surfaces converging toward the outer side of the joint, filling the portion of the joint having the converging surfaces with a wedge-shaped plug, leaving a passageway within the joint on the broad side of said plug, and forcing hot thermoplastic material into said passageway and thereby causing the plug to wedge itself against said converging surfaces.

20. A construction or expansion joint having opposite surfaces converging toward the outer side of the joint, a wedge-shaped plug filling the space in the joint between said converging surfaces, a passageway in the joint arranged on the broad side of the wedge-shaped plug, an electric resistance wire extending along the passageway, and thermoplastic sealing material filling said passageway and covering the resistance wire.

In testimony whereof, I hereto affix my signature.

GEORGE W. CHRISTIANS.